(12) United States Patent
Ito et al.

(10) Patent No.: US 12,090,022 B2
(45) Date of Patent: Sep. 17, 2024

(54) MOUTHPIECE AND MOUTHPIECE MANUFACTURING METHOD

(71) Applicant: KURARAY NORITAKE DENTAL INC., Kurashiki (JP)

(72) Inventors: Misaki Ito, Tainai (JP); Kenji Suzuki, Tainai (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 368 days.

(21) Appl. No.: 17/618,195

(22) PCT Filed: Jun. 11, 2020

(86) PCT No.: PCT/JP2020/023024
§ 371 (c)(1),
(2) Date: Dec. 10, 2021

(87) PCT Pub. No.: WO2020/250975
PCT Pub. Date: Dec. 17, 2020

(65) Prior Publication Data
US 2022/0168070 A1 Jun. 2, 2022

(30) Foreign Application Priority Data

Jun. 12, 2019 (JP) .............................. JP2019-109886
Jun. 12, 2019 (JP) .............................. JP2019-109887

(51) Int. Cl.
*B29C 64/124* (2017.01)
*A61C 7/08* (2006.01)
(Continued)

(52) U.S. Cl.
CPC ................ *A61C 7/08* (2013.01); *B33Y 10/00* (2014.12); *B33Y 80/00* (2014.12); *B29C 64/124* (2017.08); *B29C 64/40* (2017.08)

(58) Field of Classification Search
CPC .................................. A61C 7/08; B29C 64/124
See application file for complete search history.

(56) References Cited

U.S. PATENT DOCUMENTS 5,732,715 A * 3/1998 Jacobs ................. A63B 71/085
128/862
9,717,568 B1 8/2017 Adell
(Continued)

FOREIGN PATENT DOCUMENTS

CN 109414307 A 3/2019
EP 3 927 521 A1 12/2021
(Continued)

OTHER PUBLICATIONS

Extended European Search Report issued Dec. 16, 2022, in corresponding European Patent Application No. 20821760.4, 7 pages.
(Continued)

*Primary Examiner* — James Sanders
(74) *Attorney, Agent, or Firm* — Oblon, McClelland, Maier & Neustadt, L.L.P.

(57) ABSTRACT

A method for manufacturing a mouthpiece includes manufacturing the mouthpiece that is to be placed within an oral cavity to cover teeth by an additive manufacturing device and laminating hardened layers not to form an annular lamination trace in a buccal portion that covers a buccal surface of a front tooth.

9 Claims, 10 Drawing Sheets

(51) Int. Cl.
  *B33Y 10/00* (2015.01)
  *B33Y 80/00* (2015.01)
  *B29C 64/40* (2017.01)

(56) References Cited

U.S. PATENT DOCUMENTS

| | | |
|---|---|---|
| 2012/0010066 A1 | 1/2012 | Fischer et al. |
| 2013/0323665 A1 | 12/2013 | Dinh et al. |
| 2017/0007365 A1 | 1/2017 | Kopelman et al. |
| 2017/0136709 A1 | 5/2017 | Sagawa |
| 2020/0140614 A1* | 5/2020 | Parkar .................. B29C 64/165 |

FOREIGN PATENT DOCUMENTS

| | | |
|---|---|---|
| JP | 2006-81747 A | 3/2006 |
| JP | 2017-94495 A | 6/2017 |
| JP | 2018-94245 A | 6/2018 |
| WO | WO 2014/158012 A1 | 10/2014 |
| WO | WO 2019/023009 A1 | 1/2019 |

OTHER PUBLICATIONS

Fekonja et al., "Additive Manufacturing in Orthodontics", Materials and Technology, 2019, vol. 53, No. 2, pp. 165-169 (7 total pages).
International Search Report issued on Jul. 14, 2020 in PCT/JP2020/023024 filed on Jun. 11, 2020, 2 pages.

* cited by examiner

MOUTHPIECE AND MOUTHPIECE MANUFACTURING METHOD

CROSS-REFERENCE TO RELATED APPLICATION

The present application is based on and claims priority to Japanese Patent Application No. 2019-109886, filed on Jun. 12, 2019, and Japanese Patent Application No. 2019-109887, filed on Jun. 12, 2019, the disclosure of which is hereby incorporated by reference in its entirety.

TECHNICAL FIELD

The present disclosure relates to a mouthpiece that is manufactured by an additive manufacturing device and is to be placed within an oral cavity to cover teeth, and to a method for manufacturing the mouthpiece.

BACKGROUND ART

A method for manufacturing a mouthpiece by an additive manufacturing device has been known (see Patent Literature 1: JP 2018-94245 A and Patent Literature 2: JP 2006-81747 A, for example).

Patent Literature 1 discloses manufacturing an orthodontic aligner using a 3D printer based on tooth alignment data of a patient. Thereby, an aligner is directly manufactured without manufacturing a male die as in a conventional aligner. Thus, the number of processes is reduced, and accordingly, the cost is also saved.

Patent Literature 2 discloses manufacturing a bite splint using a 3D printer based on tooth alignment data of a patient. This manufacturing provides the bite splint that accurately sets or positions upper and lower jaws after upper and lower jaw osteotomy for the patient with jaw deformity.

SUMMARY

Products manufactured by a 3D printer vary in remaining lamination marks or traces depending on manufacturing directions (or lamination directions). Particularly, in a case of a product having a shape such as a dome in which surfaces are sequentially laminated from larger ones to smaller ones, annular lamination traces like annual growth rings are formed on the surface of the manufactured product. When manufacturing a product having a mouthpiece shape, an annular lamination trace is usually formed at any point of the manufactured product. Inventors have found that the formation of the annular lamination trace in a front teeth portion drastically impairs aesthetics.

A regular annular pattern is hardly seen in natural teeth. On the other hand, an annular lamination trace easily causes diffused reflection of light and makes it difficult to obtain translucence of natural teeth. Thus, an uncomfortable feeling is given when a patient wears a mouthpiece or the like in which the annular lamination trace is formed in a front teeth portion thereof. In addition, the aesthetics of the front teeth portion affects facial appearance. Thus, if the aesthetics of the front teeth portion are degraded, the quality of life (QOL) of the patient is drastically reduced.

Patent Literatures 1 and 2 do not disclose a lamination direction (manufacturing direction) when the orthodontic aligner or the bite splint are manufactured by the 3D printer. Thus, the aligner disclosed in Patent Literature 1 and the bite splint disclosed in Patent Literature 2 have the annular lamination traces formed in the front teeth portion thereof.

In view of the foregoing, an object of the present disclosure is to provide a method for manufacturing a mouthpiece that can prevent the formation of an annular lamination trace in a front teeth portion thereof.

For achieving the object, a method for manufacturing a mouthpiece according to the present disclosure includes manufacturing the mouthpiece that is to be placed within an oral cavity to cover teeth by an additive manufacturing device and laminating hardened layers not to form an annular lamination trace in a buccal portion that covers a buccal surface of a front tooth.

To achieve the object, a mouthpiece according to the present disclosure is to be placed within an oral cavity to cover teeth, wherein an annular lamination trace is not formed in a buccal portion that covers a buccal surface of a front tooth.

DETAILED DESCRIPTION

Figure 1:
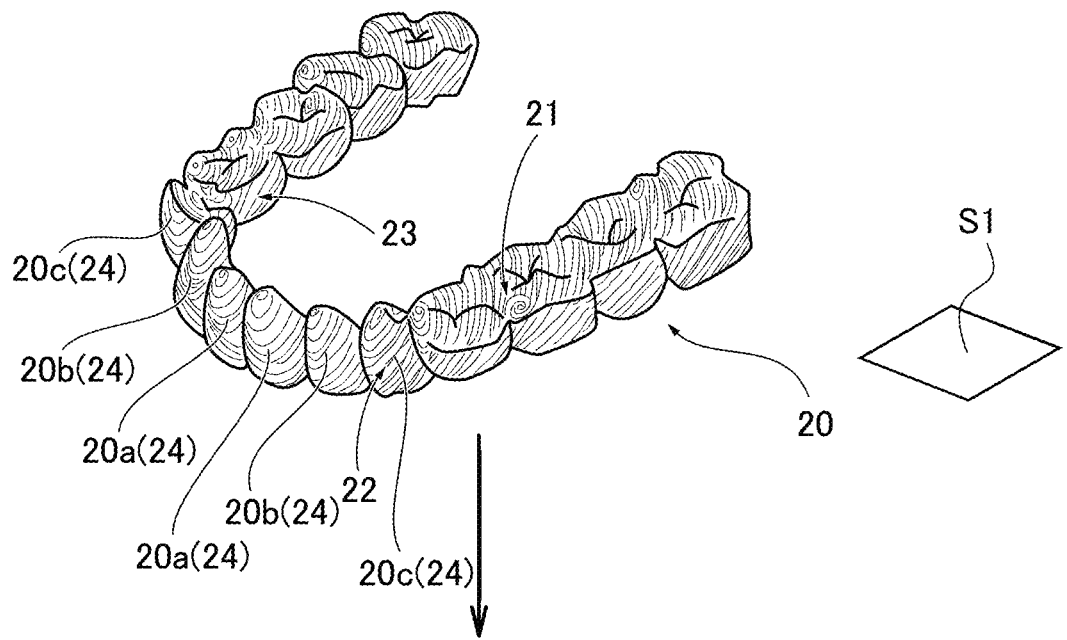
FIG. 1 is an exploded perspective view illustrating a lower jaw and an orthodontic aligner according to a first embodiment.
Figure 1:
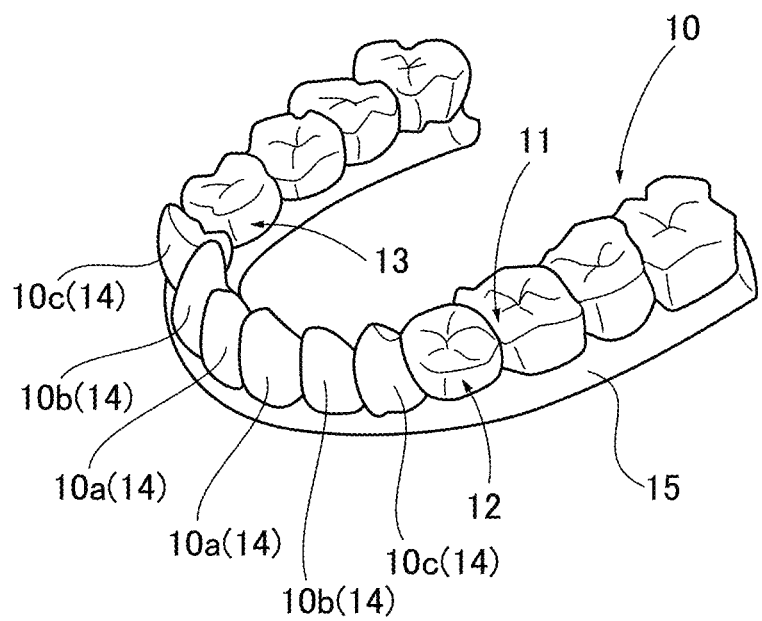

Hereinafter, embodiments of a mouthpiece and a method for manufacturing the mouthpiece according to the present disclosure will be described based on first and second embodiments illustrated in the drawings.

First Embodiment

A mouthpiece in the first embodiment is applied to an orthodontic aligner to be placed within a mouth or oral cavity to cover teeth of a lower jaw.

Figure 2:
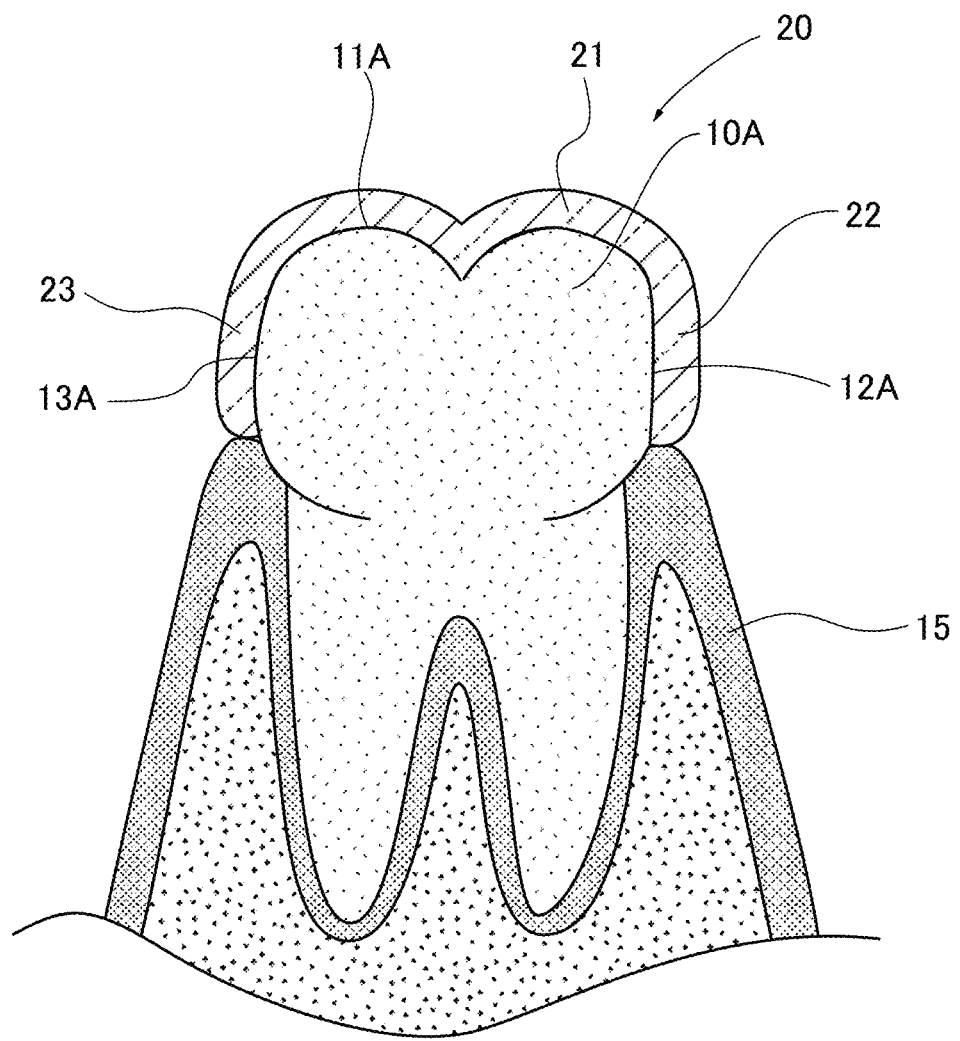
FIG. 2 is a cross-sectional view illustrating the orthodontic aligner according to the first embodiment that is attached to a tooth model of a cheek tooth at a target correction position in three-dimensional data.

(Configuration of Orthodontic Aligner) FIG. 1 is an exploded perspective view illustrating the lower jaw and the orthodontic aligner according to the first embodiment. FIG. 2 is a cross-sectional view illustrating the orthodontic aligner according to the first embodiment that is attached to a tooth model of a cheek tooth at a target correction position in three-dimensional data. Hereinafter, a configuration of the orthodontic aligner according to the first embodiment will be described.

In the drawings, teeth 10 indicate uncorrected teeth and a tooth model 10A indicates a tooth at a target correction position. In addition, as illustrated in FIG. 1, a portion of an orthodontic aligner 20 that covers front teeth 14 will be described as a front teeth portion 24.

As illustrated in FIG. 2, the orthodontic aligner 20 is formed by an additive manufacturing device based on three-dimensional data created to adhere tightly to the tooth model 10A at the target correction position. The orthodontic aligner 20 is attached to the uncorrected teeth 10 and corrects the teeth 10 to the target correction position.

(Configuration of Teeth) As illustrated in FIG. 1, each of the teeth 10 includes a tooth crown which includes an occlusal surface 11, a buccal surface 12, and a lingual surface 13. The teeth 10 are supported by a gingiva 15 surrounding the roots of the teeth 10.

The occlusal surface 11 is an end portion on a biting side of each of the upper and lower teeth and refers to an occlusal surface of the cheek teeth.

(Configuration of Tooth Model) As illustrated in FIG. 2, in a cheek teeth portion, the tooth model 10A includes an occlusal surface model 11A corresponding to the occlusal surface 11, a buccal surface model 12A corresponding to the buccal surface 12, and a lingual surface model 13A corresponding to the lingual surface 13. In the front teeth portion, the tooth model 10A includes the buccal surface model 12A corresponding to the buccal surface 12, and the lingual surface model 13A corresponding to the lingual surface 13.

(Configuration of Orthodontic Aligner) As illustrated in FIGS. 1 and 2, in the cheek teeth portion, the orthodontic aligner 20 is formed in a shape having a recessed groove defined by an occlusion portion 21, a buccal portion 22, and a lingual portion 23. In the front teeth portion, the orthodontic aligner 20 is formed in a shape having a recessed groove defined by the buccal portion 22 and the lingual portion 23. The orthodontic aligner 20 is detachable with respect to the tooth crowns of the lower jaw. The orthodontic aligner 20 is formed in a shape with a recessed groove to cover the tooth crowns of all the teeth 10 of the lower jaw.

As illustrated in FIG. 2, the occlusion portion 21 is formed in a shape following the occlusal surface model 11A of the tooth model 10A. In other words, the occlusion portion 21 is formed in the shape that covers the occlusal surface model 11A.

The buccal portion 22 is formed in a shape following the buccal surface model 12A of the tooth model 10A. In other words, the buccal portion 22 is formed in the shape that covers the buccal surface model 12A.

The lingual portion 23 is formed in a shape following the lingual surface model 13A of the tooth model 10A. In other words, the lingual portion 23 is formed in the shape that covers the lingual surface model 13A.

The orthodontic aligner 20 formed as above is placed to cover the tooth crowns of all the teeth 10 of the lower jaw. The teeth 10 to which the orthodontic aligner 20 is attached are corrected to the target correction position.

A plurality of orthodontic aligners 20 are prepared to gradually correct the teeth 10 to a final target correction position. One orthodontic aligner 20 is formed in a shape that can move and correct the teeth 10 by about 0.25 mm, for example.

Figure 3:
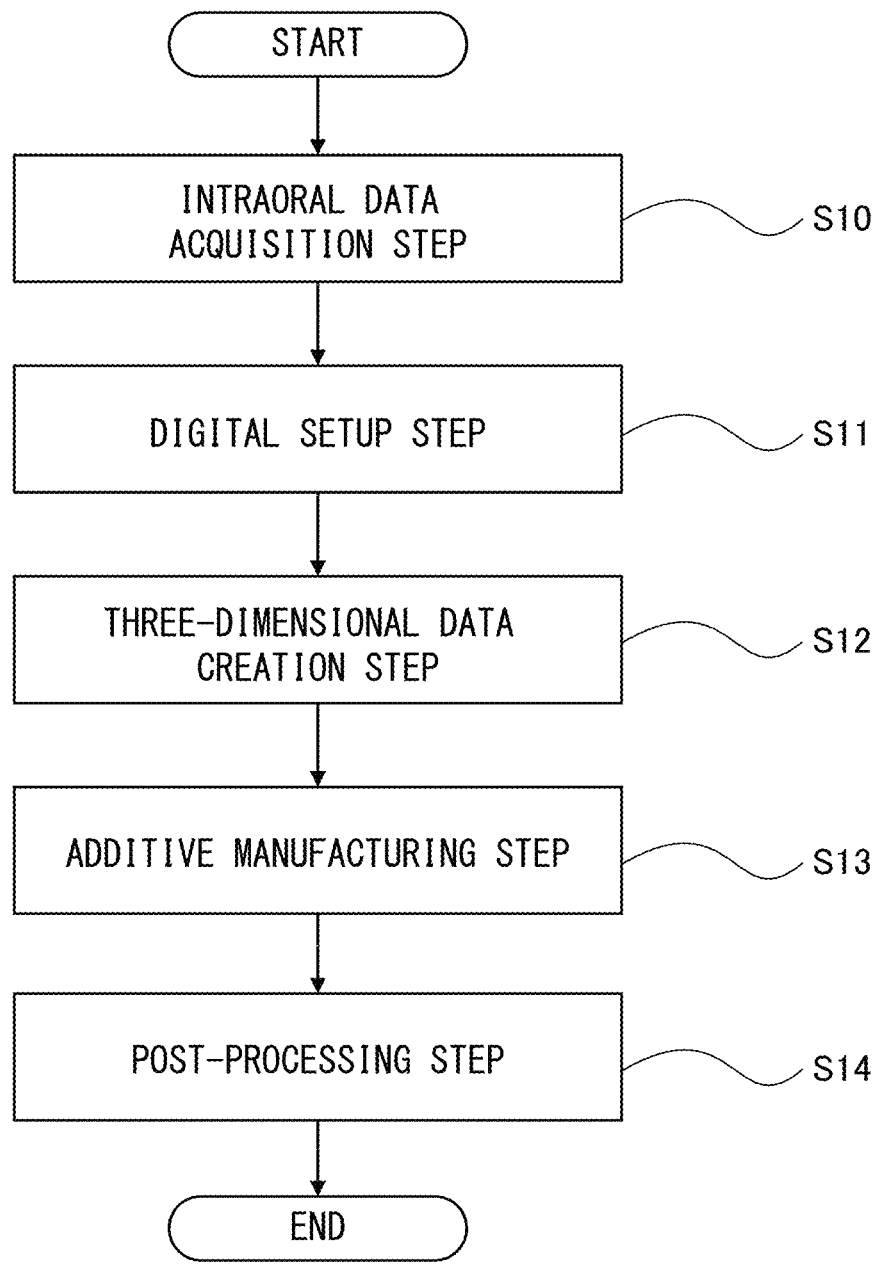
FIG. 3 is a flowchart illustrating a method for manufacturing the orthodontic aligner according to the first embodiment.
Figure 4:
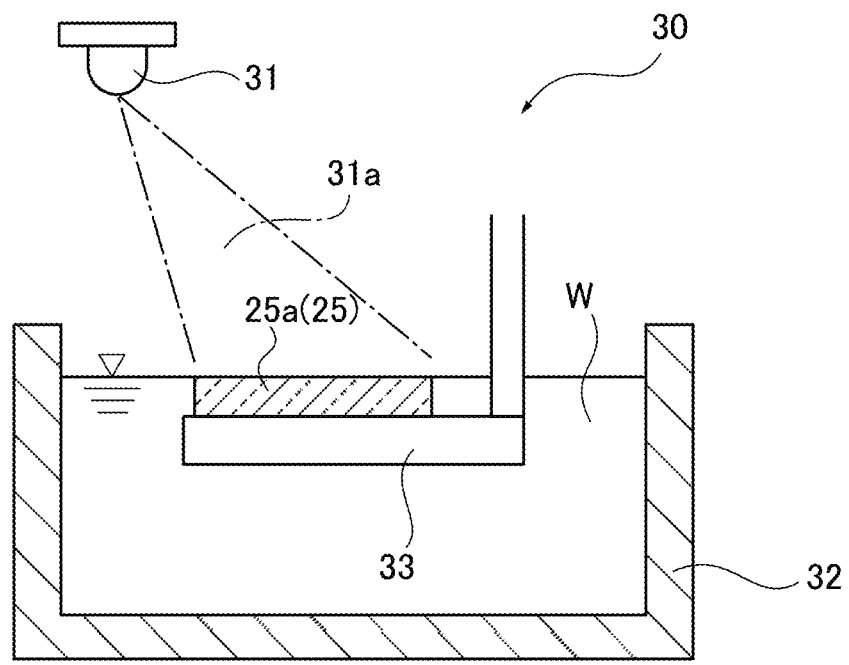
FIG. 4 is a view illustrating an additive manufacturing process according to the first embodiment.
Figure 5:
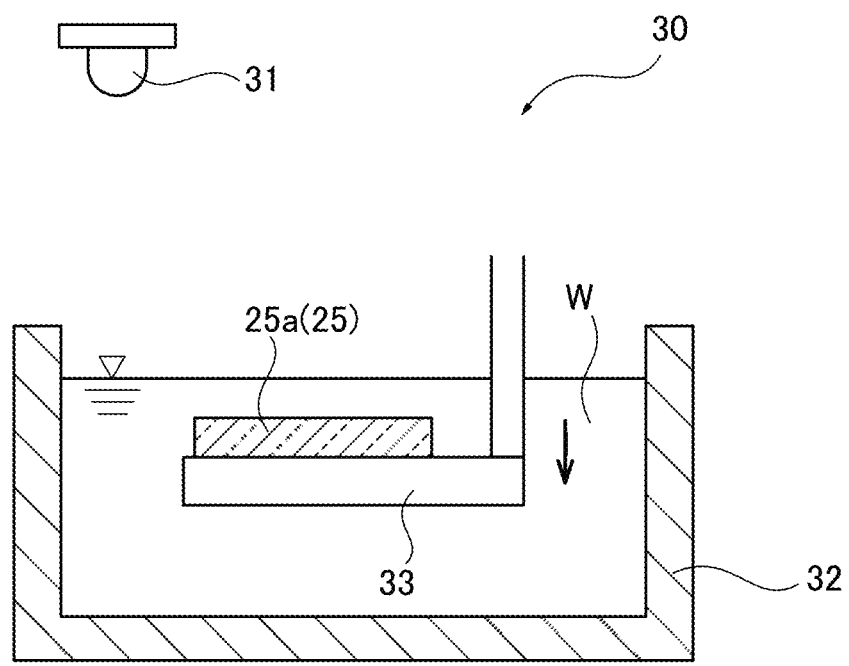
FIG. 5 is a view illustrating the additive manufacturing process according to the first embodiment.
Figure 6:
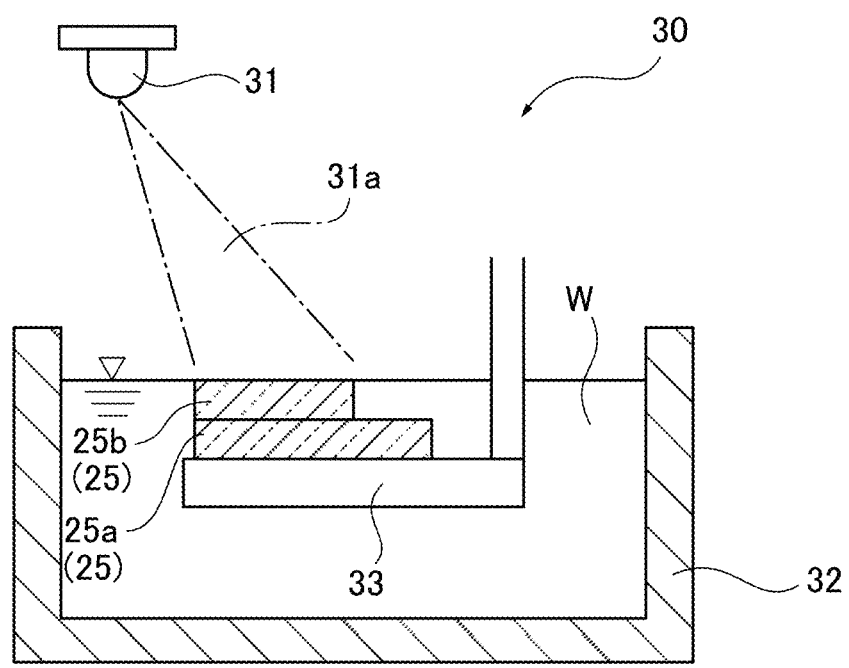
FIG. 6 is a view illustrating the additive manufacturing process according to the first embodiment.
Figure 7:
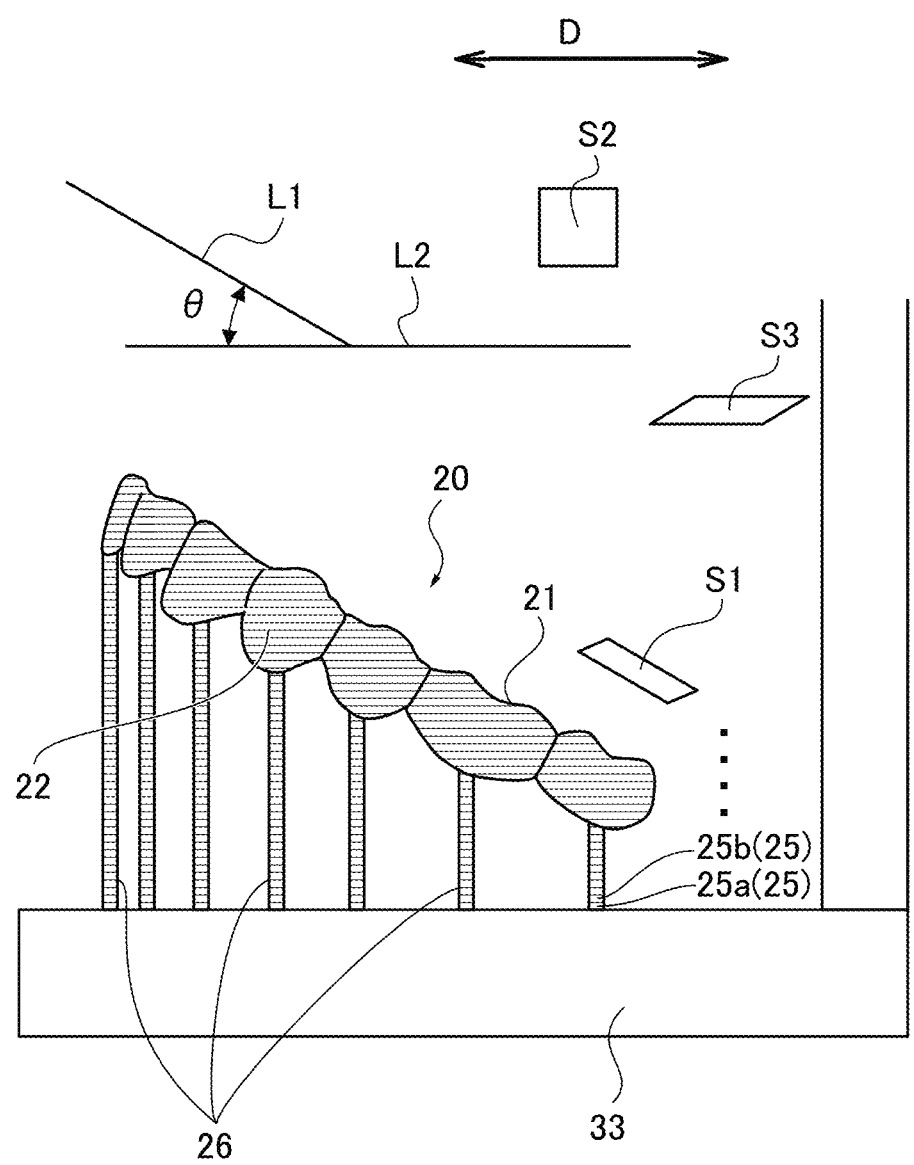
FIG. 7 is a side view illustrating a manufactured product manufactured by the additive manufacturing process according to the first embodiment.

(Method for Manufacturing Orthodontic Aligner) FIG. 3 is a flowchart illustrating a method for manufacturing the orthodontic aligner 20 according to the first embodiment. FIGS. 4 to 6 are views illustrating additive manufacturing processes according to the first embodiment. FIG. 7 is a side view illustrating a manufactured product manufactured by the additive manufacturing process according to the first embodiment. Hereinafter, a method for manufacturing the orthodontic aligner 20 according to the first embodiment will be described.

(Intraoral Data Acquisition Step) As illustrated in FIG. 3, in an intraoral data acquisition step (Step S10), intraoral three-dimensional data is acquired by scanning the inside of the oral cavity of a patient by a three-dimensional scanner.

(Digital Setup Step) In a digital setup step (Step S11), the intraoral three-dimensional data acquired in the intraoral data acquisition step is analyzed by a computer to create three-dimensional data of the tooth model 10A at the target correction position. For example, in the case of gradually correcting the teeth to the final target correction position, for example, by 0.25 mm, three-dimensional data of tooth models 10A at a plurality of target correction positions is created.

(Three-Dimensional Data Creation Step) In a three-dimensional data creation step (Step S12), three-dimensional data of the orthodontic aligner 20 is created based on the three-dimensional data of the tooth model 10A at the target correction position that has been created in the digital setup step.

Supports may be added to the created three-dimensional data of the orthodontic aligner 20 as necessary. The shape, thickness, density, angle, and presence or absence of a branch of each support are appropriately adjusted in accordance with the size and the angle of the three-dimensional data, and an overhang portion thereof.

(Additive Manufacturing Step) In an additive manufacturing step (Step S13), the orthodontic aligner 20 is manufactured by an additive manufacturing device based on the three-dimensional data of the orthodontic aligner 20 created in the three-dimensional data creation step.

Specifically, as illustrated in FIG. 4, the additive manufacturing device 30 includes a container 32 containing a liquid photo-curable resin W, a movable stage 33 configured to be vertically movable within the container 32, and an ultraviolet laser device 31 configured to emit ultraviolet laser light 31a. As the photo-curable resin W, a resin including a radical polymerizable compound such as a (meth) acrylic monomer, a polymerizable monomer containing a cationically polymerizable compound such as an epoxy compound, and a photopolymerization initiator may be used, for example.

As illustrated in FIG. 4, the additive manufacturing device 30 is initially disposed such that the top surface of the movable stage 33 is located below the liquid surface of the photo-curable resin W by a predetermined distance (for example, 0.01 mm).

Then, the ultraviolet laser device 31 scans a thin layer of the photo-curable resin W on the movable stage 33 with the ultraviolet laser light 31a using a predetermined pattern based on the three-dimensional data of the orthodontic aligner 20. Thereby, a first hardened layer 25a, which is an example of a hardened layer 25, having the external form of the teeth 10 is formed.

Subsequently, as illustrated in FIG. 5, the movable stage 33 moves downward by a predetermined distance (for example, 0.01 mm). Thereby, a thin layer of the photo-curable resin W is formed on the first hardened layer 25a.

Next, as illustrated in FIG. 6, the ultraviolet laser device 31 scans the thin layer of the photo-curable resin W on the first hardened layer 25a with the ultraviolet laser light 31a using a predetermined pattern based on the three-dimensional data of the orthodontic aligner 20. Thereby, a second hardened layer 25b, which is an example of the hardened layer 25, having the external form of the teeth 10 is formed.

Then, by repeating similar operations, the orthodontic aligner 20 in which a plurality of hardened layers 25a, 25b, ..., and 25n (25) are laminated at a predetermined lamination pitch (0.01 mm in first embodiment), and to which supports 26 are attached is finally manufactured as illustrated in FIG. 7.

Note that an occlusal plane in the orthodontic aligner 20 that covers the occlusal surface 11 of the teeth 10 is defined as an occlusal plane S1. The occlusal plane refers to a reference surface that is defined as a plane including a middle point (incisal point) between mesial angles of the left and right central incisors, and a distal buccal cusp of left and right first molar teeth. In other words, the occlusal plane S1 is a plane parallel to an arrangement direction of portions that cover the respective teeth 10 of the orthodontic aligner 20. A vertical surface including a front-back direction D of the orthodontic aligner 20 is defined as a vertical surface S2.

An intersection line of the occlusal plane S1 and the vertical surface S2 is defined as a first intersection line L1. An intersection line of the vertical surface S2 and a horizontal surface S3 is defined as a second intersection line L2. An angle between the first intersection line L1 and the second intersection line L2 is defined as an angle θ. The hardened layers 25 are laminated in a vertical direction with the orthodontic aligner 20 placed at the angle θ.

(Post-Processing Step) In a post-processing step (Step S14), the supports 26 are removed from the orthodontic aligner 20 by a tool such as a nipper. After removing the supports 26, the traces of the supports 26 may be removed by polishing.

In addition, in the post-processing step (Step S14), a part or all of unreacted substances such as an unpolymerized monomer, for example, are removed from the manufactured orthodontic aligner 20. The post-processing step may include the removal of unreacted substances using gravitational force or centrifugal force, the removal of unreacted substances by washing using an organic solvent or air blow, drying, and photopolymerization or heat polymerization by an irradiator using a fluorescent lamp, a halogen lamp, or an LED light source.

The orthodontic aligner 20 is manufactured through the above steps.

Figure 8:
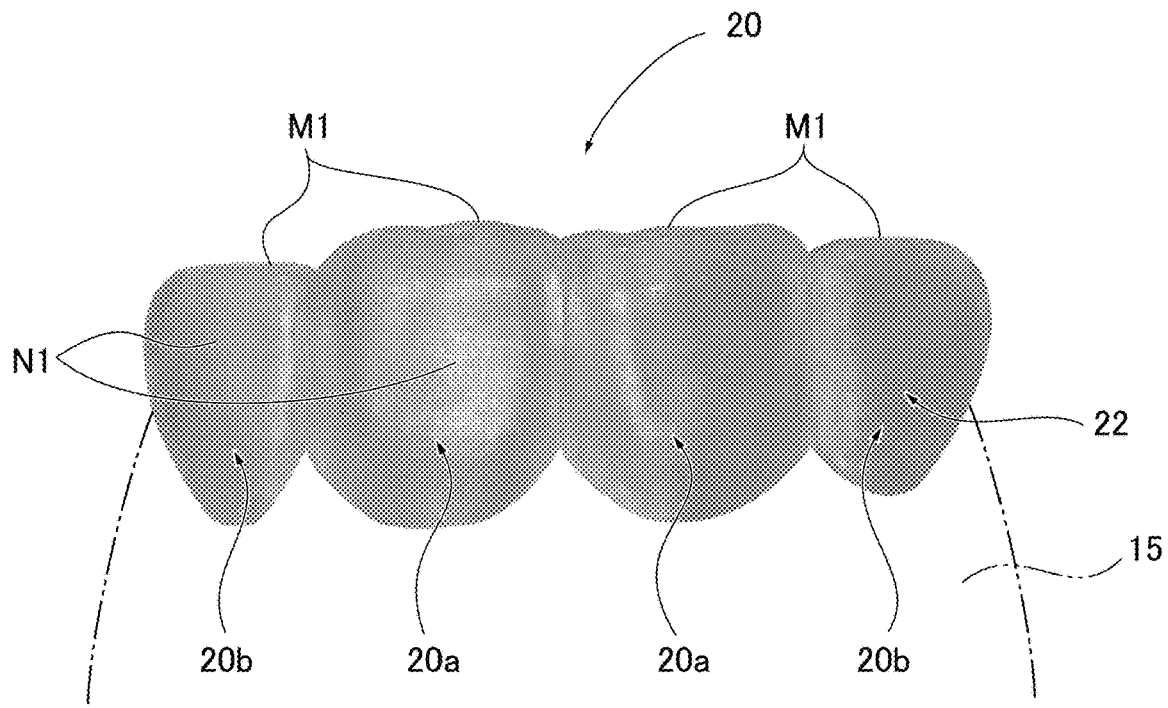
FIG. 8 is a view illustrating a front teeth portion obtained when an orthodontic aligner is manufactured at an angle $\theta=0°$.
Figure 9:
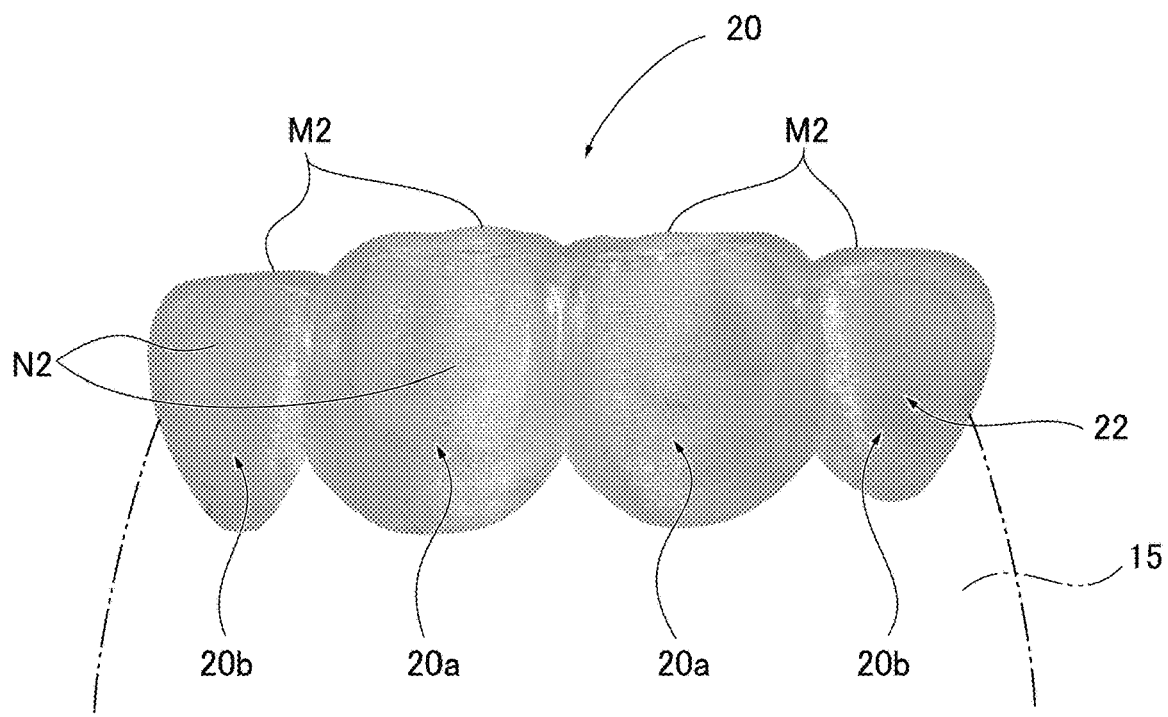
FIG. 9 is a view illustrating a front teeth portion obtained when an orthodontic aligner is manufactured at an angle $\theta=30°$.
Figure 10:
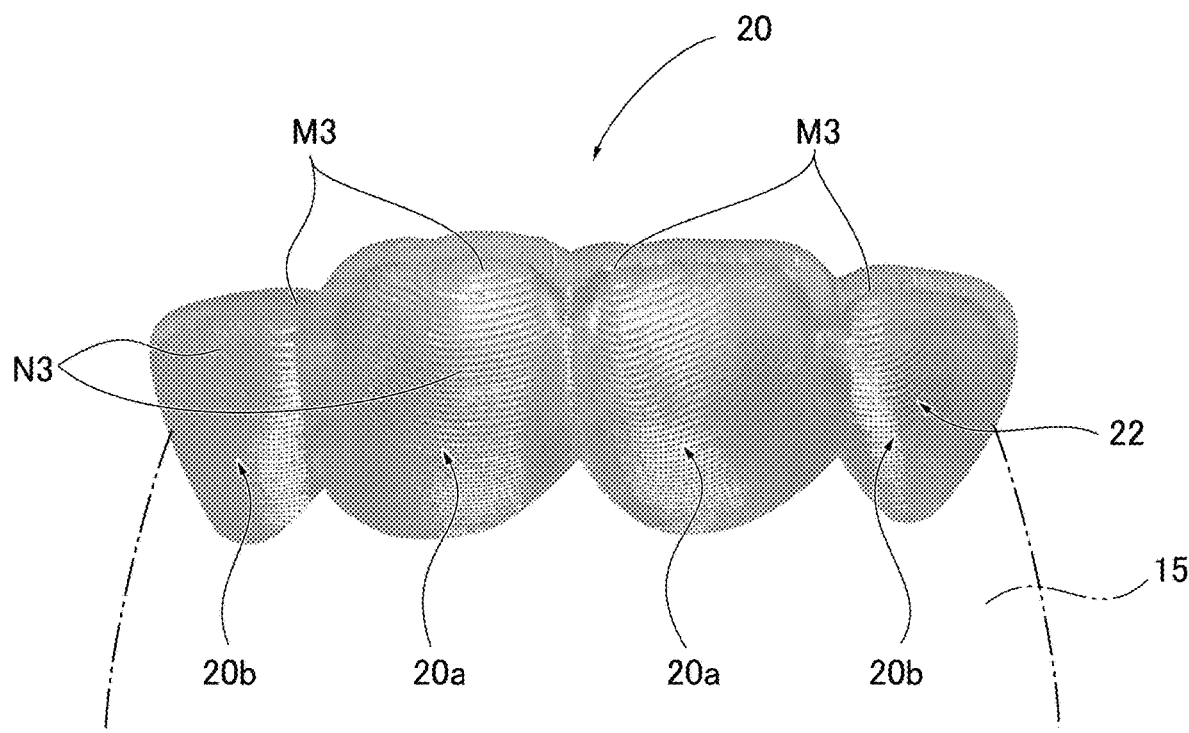
FIG. 10 is a view illustrating a front teeth portion obtained when an orthodontic aligner is manufactured at an angle $\theta=60°$.
Figure 11:
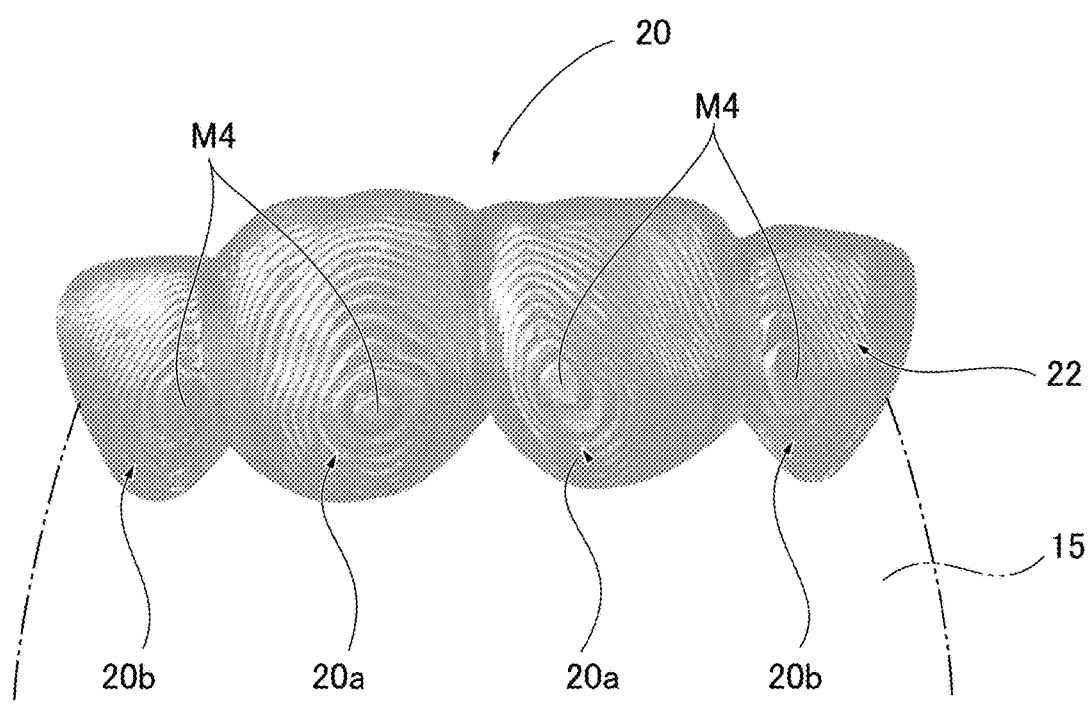
FIG. 11 is a view illustrating a front teeth portion obtained when an orthodontic aligner is manufactured at an angle $\theta=90°$.

(Orthodontic Aligner Manufactured at Various Angles) FIG. 8 is a view illustrating the front teeth portion obtained when the orthodontic aligner is manufactured at an angle θ=0°. FIG. 9 is a view illustrating the front teeth portion obtained when the orthodontic aligner is manufactured at an angle θ=30°. FIG. 10 is a view illustrating the front teeth portion obtained when the orthodontic aligner is manufactured at an angle θ=60°. FIG. 11 is a view illustrating the front teeth portion obtained when the orthodontic aligner is manufactured at an angle θ=90°. Hereinafter, the orthodontic aligners manufactured at various angles will be explained.

Note that, as illustrated in FIG. 1, the front teeth portion 24 of the orthodontic aligner 20 that covers central incisors 10a of the front teeth 14 is defined as central incisor portions 20a. The front teeth portion 24 of the orthodontic aligner 20 that covers lateral incisors 10b of the front teeth 14 is defined as lateral incisor portions 20b. The front teeth portion 24 of the orthodontic aligner 20 that covers canine teeth 10c of the front teeth 14 is defined as canine teeth portions 20c.

(Angle θ=0°) In the case of the angle θ=0°, as illustrated in FIG. 8, annular lamination traces M1 are formed at upper ends of the central incisor portions 20a and the lateral incisor portions 20b. The annular lamination traces M1 are totally invisible when the central incisor portions 20a and the lateral incisor portions 20b are viewed from the front side. In addition, linear lamination traces N1 are formed substantially horizontally in the buccal portions 22 of the central incisor portions 20a and the lateral incisor portions 20b.

In the case of the angle θ=0°, in the orthodontic aligner 20, the hardened layers 25 are laminated in a vertical direction to the occlusal plane S1. Thus, the lamination traces N1 are formed in the buccal portion 22 of the front teeth portion 24 of the orthodontic aligner 20 horizontally to the occlusal plane S1. Note that, in the case of the angle θ=180°, the lamination traces are formed in the manufactured product similar to the manufactured product in the case of the angle θ=0°.

(Angle θ=30°) In the case of the angle θ=30°, as illustrated in FIG. 9, annular lamination traces M2 are formed at the upper ends of the central incisor portions 20a and the lateral incisor portions 20b. The annular lamination traces M2 are hardly visible when the central incisor portions 20a and the lateral incisor portions 20b are viewed from the front side. In addition, linear lamination traces N2 are formed substantially horizontally in the buccal portions 22 of the central incisor portions 20a and the lateral incisor portions 20b.

In the case of the angle θ=30°, in the orthodontic aligner 20, the hardened layers 25 are laminated in a direction inclined by the angle θ=30° with respect to the vertical direction to the occlusal plane S1. Note that, in the case of the angle θ=150°, the angle θ=210°, or the angle θ=330°, the lamination traces are formed in a manufactured product similar to the manufactured product in the case of the angle θ=30°.

(Angle θ=60°) In the case of the angle θ=60°, as illustrated in FIG. 10, annular lamination traces M3 are formed at the upper ends of the central incisor portions 20a and the lateral incisor portions 20b. The annular lamination traces M3 are visible to some extent in the upper ends of the central incisor portions 20a and the lateral incisor portions 20b but unnoticeable when the central incisor portions 20a and the lateral incisor portions 20b are viewed from the front side. In addition, curved lamination traces N3 are formed in the buccal portions 22 of the central incisor portions 20a and the lateral incisor portions 20b between an upper portion and a lower portion.

In the case of the angle θ=60°, in the orthodontic aligner 20, the hardened layers 25 are laminated in a direction inclined by the angle θ=60° with respect to the vertical direction to the occlusal plane S1. Note that, in the case of the angle θ=120°, the angle θ=240°, or the angle θ=300°, the lamination traces are formed in a manufactured product similar to the manufactured product in the case of the angle θ=60°.

(Angle θ=90°) In the case of the angle θ=90°, as illustrated in FIG. 11, annular lamination traces M4 are formed on the buccal surface 12 of the central incisor portions 20a and the lateral incisor portions 20b. The annular lamination traces M4 are clearly visible on the entire surfaces of the buccal portions 22 of the central incisor portions 20a and the lateral incisor portions 20b when the central incisor portions 20a and the lateral incisor portions 20b are viewed from the front side.

In the case of the angle θ=90°, in the orthodontic aligner 20, the hardened layers 25 are laminated in a direction inclined by the angle θ=90° with respect to the vertical direction to the occlusal plane S1. Note that, in the case of the angle θ=270°, the lamination traces are formed in a manufactured product similar to the manufactured product in the case of the angle θ=90°.

In view of the foregoing, the orthodontic aligner 20 is preferably manufactured in such a manner that the angle θ becomes 0 to 60°, 120 to 240°, or 300 to 360°.

The orthodontic aligner 20 is more preferably manufactured in such a manner that the angle θ becomes 0 to 30°, 150 to 210°, or 330 to 360°.

In other words, the orthodontic aligner 20 is manufactured by laminating the hardened layers 25 not to form the annular lamination trace in the buccal portion 22 that covers the buccal surfaces 12 of the front teeth (central incisor portions 20a, lateral incisor portions 20b, canine teeth portions 20c).

(Functions of Orthodontic Aligner and Method for Manufacturing Orthodontic Aligner) Hereinafter, functions of the orthodontic aligner and the method for manufacturing the orthodontic aligner according to the first embodiment will be described. A method for manufacturing the mouthpiece (orthodontic aligner 20) according to the first embodiment includes manufacturing by the additive manufacturing device 30 the mouthpiece to be placed within the mouth or oral cavity to cover the teeth 10 and by laminating the hardened layers 25 not to form an annular lamination trace in the buccal portion 22 that covers the buccal surfaces 12 of the front teeth (central incisors 10a, lateral incisors 10b, canine teeth 10c) (FIG. 7).

Thereby, it is possible to prevent the annular lamination trace from being formed in the buccal portion 22 that covers the buccal surfaces 12 of the front teeth (central incisors 10a, lateral incisors 10b, canine teeth 10c) of the mouthpiece (orthodontic aligner 20). Therefore, it is possible to prevent the annular lamination trace from being seen by other people when the mouthpiece (orthodontic aligner 20) is placed within the mouth. As a result, it is possible to improve aesthetics when the mouthpiece (orthodontic aligner 20) is placed within the mouth.

In a case where the mouthpiece (orthodontic aligner 20) is manufactured by laminating hardened layers to form or leave the annular lamination traces in the buccal portion 22 that covers the buccal surfaces 12 of the front teeth (central incisors 10a, lateral incisors 10b, canine teeth 10c) of the mouthpiece (orthodontic aligner 20), unevenness (or steps) corresponding to a lamination pitch is formed in the buccal portion 22 in which the annular lamination traces are formed. Thus, the feeling of a foreign matter becomes noticeable when the mouthpiece (orthodontic aligner 20) is placed within the mouth.

On the other hand, in the first embodiment, the mouthpiece (orthodontic aligner 20) is manufactured by laminating the hardened layers 25 not to form the annular lamination trace in the buccal portion 22 that covers the buccal surfaces 12 of the front teeth (central incisors 10a, lateral incisors 10b, canine teeth 10c). This makes unevenness smaller than one corresponding to the lamination pitch that is formed in the buccal portion 22 in the case that the annular lamination trace is formed or left. As a result, it is possible to suppress the feeling of the foreign matter when the mouthpiece (orthodontic aligner 20) is placed within the mouth.

In the method for manufacturing the mouthpiece (orthodontic aligner 20) according to the first embodiment, the mouthpiece is manufactured by laminating the hardened layers 25 in the vertical direction such that the angle θ between the first intersection line L1 and the second intersection line L2 becomes 0 to 60°, 120 to 240°, or 300 to 360° (FIG. 10). The first intersection line L1 is defined by the occlusal plane S1 of the mouthpiece (orthodontic aligner 20) and the vertical surface S2 including the front-back direction D. The second intersection line L2 is defined by the horizontal surface S3 and the vertical surface S2 including the front-back direction D.

Thereby, it is possible to prevent the annular lamination trace from being formed in the buccal portion 22 that covers the buccal surfaces 12 of the front teeth (central incisors 10a, lateral incisors 10b, canine teeth 10c) of the mouthpiece (orthodontic aligner 20). Therefore, it is possible to improve aesthetics when the mouthpiece (orthodontic aligner 20) is placed within the mouth.

In the manufacturing method of the mouthpiece (orthodontic aligner 20) according to the first embodiment, the mouthpiece is manufactured by laminating the hardened layers 25 in the vertical direction such that the angle θ between the first intersection line L1 and the second intersection line L2 becomes 0 to 30°, 150 to 210°, or 330 to 360° (FIG. 9). The first intersection line L1 is defined by the occlusal plane S1 of the mouthpiece (orthodontic aligner 20) and the vertical surface S2 including the front-back direction D. The second intersection line L2 is defined by the horizontal surface S3 and the vertical surface S2 including the front-back direction D.

Thereby, it is possible to form the substantially linear lamination trace in the buccal portion 22 that covers the buccal surfaces 12 of the front teeth (central incisors 10a, lateral incisors 10b, canine teeth 10c) of the mouthpiece (orthodontic aligner 20). Therefore, it is possible to improve aesthetics when the mouthpiece (orthodontic aligner 20) is placed within the mouth.

The mouthpiece (orthodontic aligner 20) according to the first embodiment is placed within the mouth or oral cavity to cover the teeth 10. The mouthpiece does not include an annular lamination trace in the buccal portion 22 that covers the buccal surfaces 12 of the front teeth (central incisors 10a, lateral incisors 10b, canine teeth 10c) (FIGS. 8 and 9).

Thereby, it is possible to prevent the annular lamination trace from being formed in the buccal portion 22 that covers the buccal surfaces 12 of the front teeth (central incisors 10a, lateral incisors 10b, canine teeth 10c) of the mouthpiece (orthodontic aligner 20). Therefore, it is possible to prevent the annular lamination trace from being seen by other people when the mouthpiece (orthodontic aligner 20) is placed within the mouth. As a result, it is possible to improve aesthetics when the mouthpiece (orthodontic aligner 20) is placed within the mouth.

Second Embodiment

A mouthpiece and a method for manufacturing the mouthpiece according to the second embodiment differ from the mouthpiece and the method for manufacturing the mouthpiece according to the first embodiment in that an angle θ at which the orthodontic aligner is manufactured in an additive manufacturing process is different.

Figure 12:
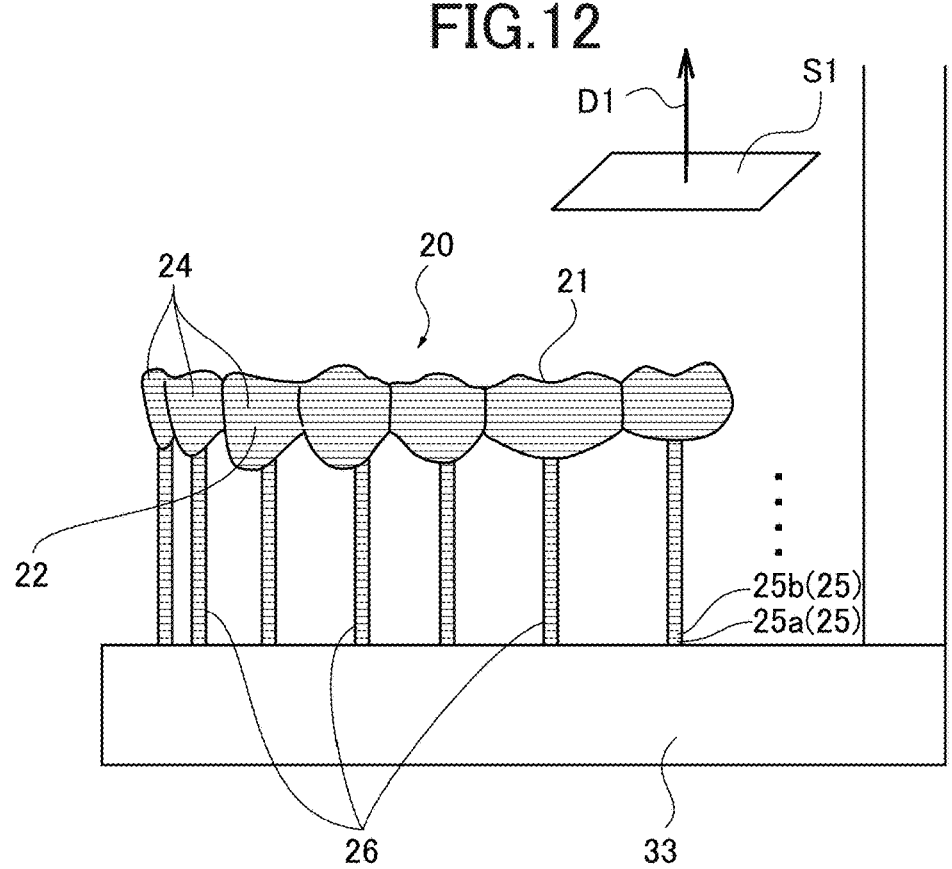
FIG. 12 is a side view illustrating a manufactured product manufactured by an additive manufacturing process according to a second embodiment.

(Method for Manufacturing Orthodontic Aligner) FIG. 12 is a side view illustrating a manufactured product manufactured by an additive manufacturing process according to the second embodiment. Hereinafter, a method for manufacturing the orthodontic aligner according to the second embodiment will be described. Note that parts of the second embodiment identical or equivalent to the parts described in the first embodiment will be described using the identical terms or adding the identical reference numerals.

(Additive Manufacturing Process) In the additive manufacturing process, as illustrated in FIG. 12, an orthodontic aligner 20 is manufactured by laminating hardened layers 25 in a vertical direction D1 relative to an occlusal plane S1 (or direction perpendicular to occlusal plane S1) at a predetermined lamination pitch (0.01 mm in second embodiment). In other words, the orthodontic aligner 20 is manufactured by an additive manufacturing device 30 assuming that a lamination direction corresponds to the vertical direction D1 relative to the occlusal plane S1. The orthodontic aligner 20 includes lamination traces in the vertical direction D1 relative to the occlusal plane S1. In other words, in the orthodontic aligner 20, the hardened layers 25 are laminated with an angle that is formed between the first intersection line L1 and the second intersection line L2 and set to the angle $\theta=0°$.

Note that, in the case of the angle $\theta=180°$, the lamination traces are formed in a manufactured product similar to the manufactured product in the case of the angle $\theta=0°$. Also, note that the vertical direction D1 includes an error of about 1°.

The orthodontic aligner 20 is provided with supports 26 that support the orthodontic aligner 20. The supports 26 are formed on an opposite side of the occlusion portion 21 that serves as an occlusal surface of the orthodontic aligner 20 to extend in the vertical direction D1 relative to the occlusal plane S1.

Figure 13:
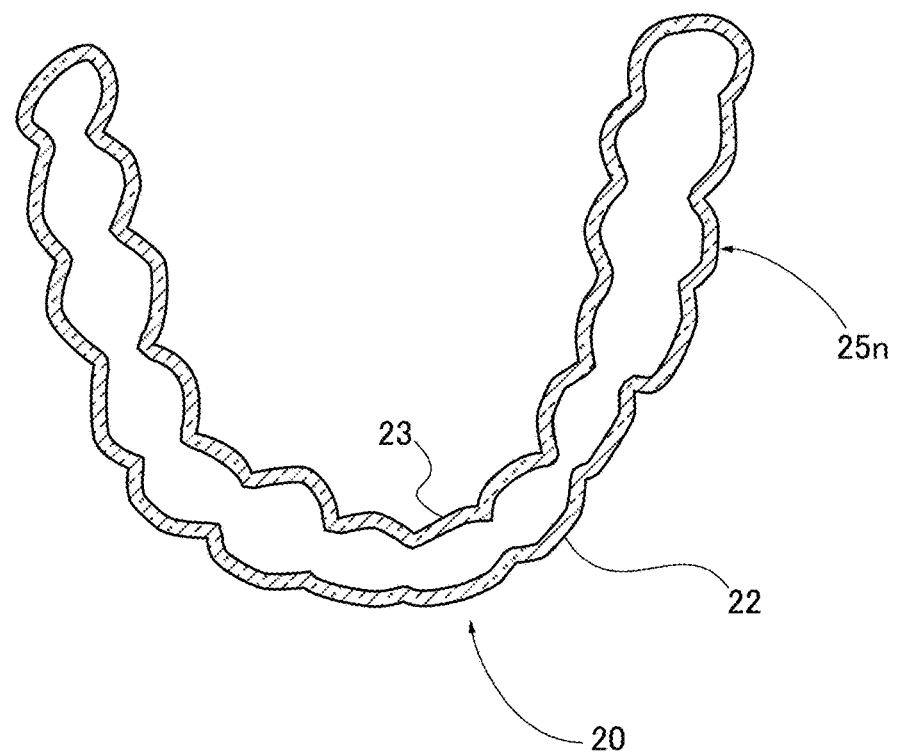
FIG. 13 is a cross-sectional view of a hardened layer of an orthodontic aligner according to the second embodiment.

(Functions of Orthodontic Aligner and Method for Manufacturing Orthodontic Aligner) FIG. 13 is a cross-sectional view of the hardened layer of the orthodontic aligner according to the second embodiment. Hereinafter, functions of the orthodontic aligner and the method for manufacturing the orthodontic aligner according to the second embodiment will be described.

In the method for manufacturing the mouthpiece (orthodontic aligner 20) according to the second embodiment, the mouthpiece is manufactured by laminating the hardened layers 25 in the vertical direction D1 relative to the occlusal plane S1 of the mouthpiece (orthodontic aligner 20) (FIG. 12).

Thereby, it is possible to prevent an annular lamination trace from being formed in the buccal portion 22 that covers the buccal surfaces 12 of the front teeth (central incisors 10a, lateral incisors 10b, canine teeth 10c) of the mouthpiece (orthodontic aligner 20). Therefore, it is possible to prevent the annular lamination trace from being seen by other people when the mouthpiece (orthodontic aligner 20) is placed within the mouth. As a result, it is possible to improve aesthetics when the mouthpiece (orthodontic aligner 20) is placed within the mouth.

In addition, as illustrated in FIG. 13, an area of the hardened layer 25 can be made larger. Thus, the strength of the mouthpiece (orthodontic aligner 20) in the vertical direction D1 relative to the occlusal plane S1 can be increased. On the other hand, in a case where the hardened layers 25 are laminated in a horizontal direction relative to the occlusal plane S1, an area of each layer becomes smaller, and the strength of the mouthpiece in the vertical direction D1 relative to the occlusal plane S1 becomes lower.

In addition, the manufactured product manufactured by the additive manufacturing device 30 has higher strength in the direction perpendicular to the lamination direction than strength in the lamination direction. In the second embodiment, the lamination direction corresponds to the vertical direction D1 relative to the occlusal plane S1. Accordingly, it is possible to increase tensile strength and compressive strength in the horizontal direction relative to the occlusal plane S1. In other words, in the second embodiment, the buccal portions 22 of the front teeth portion 24 that covers the front teeth 14 of the teeth 10 can increase tensile strength and compressive strength in the horizontal direction relative to the occlusal plane S1. Therefore, it is possible to increase the strength of the front teeth portion 24 to which a load of bending, stretching, twisting, or the like is repeatedly applied when the mouthpiece (orthodontic aligner 20) is attached or detached.

In addition, it is possible to increase compressive strength in the lamination direction of the manufactured product manufactured by the additive manufacturing device 30 as the number of laminated layers increases. Further, because the hardened layers 25 are laminated in the vertical direction D1 relative to the occlusal plane S1 of the mouthpiece (orthodontic aligner 20), the number of laminated layers in the buccal portion 22 can be increased more than a case where the hardened layers 25 are laminated in directions other than the vertical direction D1. Therefore, it is possible to increase the compressive strength of the buccal portion 22 more than the case where the hardened layers 25 are laminated in directions other than the vertical direction D1. As a result, it is possible to increase the strength of the buccal portion 22 that receives counteracting force from the teeth 10 to be corrected, when correction is performed by the mouthpiece (orthodontic aligner 20), and make creep deformation difficult to be generated in the buccal portion 22. In other words, it is possible to suppress the deformation of the mouthpiece (orthodontic aligner 20) caused by the teeth 10. As a result, it is possible to improve the accuracy of correction of the teeth 10 that is performed by the mouthpiece (orthodontic aligner 20).

In the method for manufacturing the mouthpiece (orthodontic aligner 20) according to the second embodiment, the mouthpiece (orthodontic aligner 20) is formed in a shape having a recessed groove to cover all of the teeth of the upper jaw or the teeth of the lower jaw (FIG. 2).

Thereby, as illustrated in FIG. 13, the hardened layer 25 can be formed into a closed (or uninterrupted) annular shape. Therefore, it is possible to increase the strength of the mouthpiece (orthodontic aligner 20).

In the method for manufacturing the mouthpiece (orthodontic aligner 20) according to the second embodiment, in the mouthpiece (orthodontic aligner 20), the supports 26 that support the mouthpiece (orthodontic aligner 20) are formed on an opposite side of the occlusion portion 21 of the mouthpiece (orthodontic aligner 20) (FIG. 12) to extend in the vertical direction D1 relative to the occlusal plane S1.

This can prevent the traces of the supports 26 from being formed in the occlusion portion 21 after removing the supports 26. Therefore, it is possible to prevent stress from being concentrated on the occlusion portion 21 due to the trace of the supports 26. As a result, it is possible to improve the durability of the occlusion portion 21 to which load is repeatedly applied.

The mouthpiece (orthodontic aligner 20) according to the second embodiment is to be placed within the mouth or oral cavity to cover the teeth 10 and includes a lamination trace in the vertical direction D1 relative to the occlusal plane S1 of the mouthpiece (orthodontic aligner 20) (FIG. 12).

Thereby, it is possible to prevent the annular lamination trace from being formed in the buccal portion 22 that covers the buccal surfaces 12 of the front teeth (central incisors 10a, lateral incisors 10b, canine teeth 10c) of the mouthpiece (orthodontic aligner 20). Therefore, it is possible to prevent the annular lamination trace from being seen by other people when the mouthpiece (orthodontic aligner 20) is placed within the mouth. As a result, it is possible to improve aesthetics when the mouthpiece (orthodontic aligner 20) is placed within the mouth.

In addition, an area of the hardened layer 25 can be made larger. Thus, the strength of the mouthpiece (orthodontic aligner 20) in the vertical direction D1 relative to the occlusal plane S1 can be increased.

Note that, the descriptions of the other configurations and functional effects thereof are omitted since they are substantially the same as those of the first embodiment.

(Evaluation of Aesthetic Satisfaction) For confirming the effects of the mouthpiece (orthodontic aligner 20) according to the present disclosure, evaluation of aesthetic satisfaction was conducted as follows.

Figure 14:
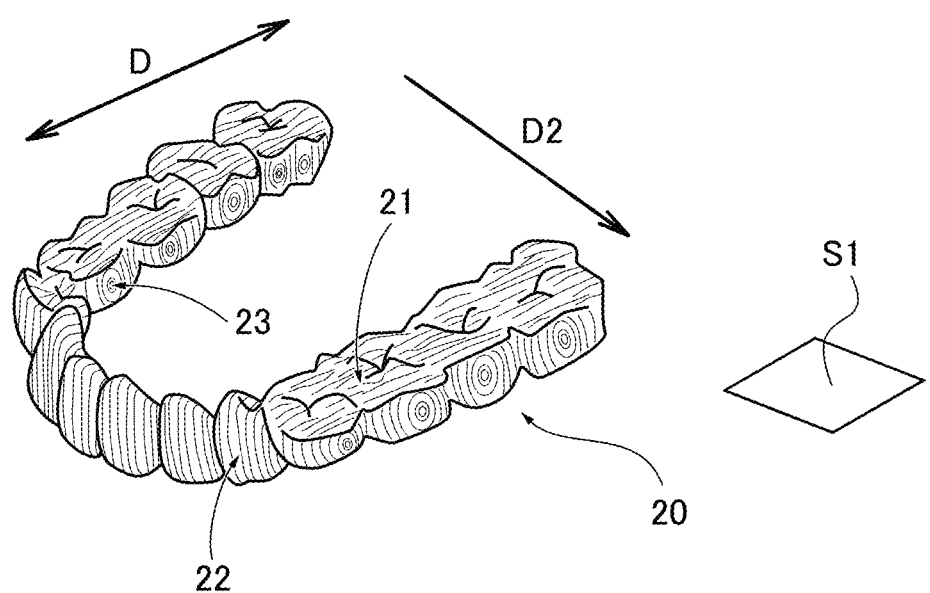
FIG. 14 is a perspective view illustrating a method for manufacturing an orthodontic aligner according to another embodiment.

The orthodontic aligner 20 manufactured at the angle $\theta=0°$ that is illustrated in FIG. 8, the orthodontic aligner 20 manufactured at the angle $\theta=30°$ that is illustrated in FIG. 9, the orthodontic aligner 20 manufactured at the angle $\theta=60°$ that is illustrated in FIG. 10, the orthodontic aligner 20 manufactured at the angle $\theta=90°$ that is illustrated in FIG. 11, and the orthodontic aligner 20 manufactured in the lamination direction D2 corresponding to a width direction perpendicular to the front-back direction D that is illustrated in FIG. 14 were prepared.

Five test subjects check a state in which each of the orthodontic aligners 20 is attached. Five-stage evaluation including "not feel at all=4 points", "not feel so much=3 points", "feel a little=2 points", "feel strongly=1 point", and "feel very strongly=0 points" was conducted for the following three items.

Lamination unevenness: unevenness is noticeable
Transparency: low transparency
Unnaturalness: an uncomfortable feeling of "not being natural teeth" is given Cases in which an average value calculated for each item exceeds 2 were evaluated that aesthetics is good.

The orthodontic aligner 20 manufactured at the angle $\theta=0°$ was evaluated to have lamination unevenness of 3.6, transparency of 3.2, and unnaturalness of 3.6. The orthodontic aligner 20 manufactured at the angle $\theta=30°$ was evaluated to have lamination unevenness of 3.6, transparency of 3.8, and unnaturalness of 3.8. The orthodontic aligner 20 manufactured at the angle $\theta=60°$ was evaluated to have lamination unevenness of 2.8, transparency of 3.4, and unnaturalness of 3.2. The orthodontic aligner 20 manufactured at the angle $\theta=90°$ was evaluated to have lamination unevenness of 1.6, transparency of 1.2, and unnaturalness of 1.2. The orthodontic aligner 20 manufactured in the lamination direction D2 corresponding to the width direction perpendicular to the front-back direction D was evaluated to have lamination unevenness of 3.2, transparency of 3.8, and unnaturalness of 3.2.

As described above, in the cases of the angles $\theta=0°$, the angle $\theta=30°$, and the angle $\theta=60°$, good evaluation was obtained for all items. Among them, in the cases of the angle $\theta=0°$ and the angle $\theta=30°$, better evaluation was obtained for all items. In addition, also in the case where the orthodontic aligner 20 was manufactured in the lamination direction D2 corresponding to the width direction perpendicular to the front-back direction D, a good evaluation was obtained for all items. On the other hand, in the case of the angle $\theta=90°$, a good evaluation was not obtained for all items.

The mouthpiece and the method for manufacturing the mouthpiece according to the present disclosure have been described based on the first and second embodiments. However, specific configurations are not limited to those in these embodiments, and design change, modification, and addition are allowed without departing from the gist of the invention set forth in each claim of the appended claims.

Each of the first and second embodiments shows an example in which the hardened layers 25 are laminated in the vertical direction such that the angle $\theta$ between the first intersection line L1 and the second intersection line L2 becomes 0 to 60°, 120 to 240°, or 300 to 360°. However, as illustrated in FIG. 14, the lamination direction D2 may be set to the width direction perpendicular to the front-back direction D. In addition, the lamination direction may be set to a direction inclined with respect to the width direction perpendicular to the front-back direction D. Thereby, it is possible to form lamination traces in a longitudinal direction in a buccal portion that covers the buccal surfaces of front teeth and improve aesthetics.

In the first and second embodiments, a suspension-type stereolithography device that uses a photo-curable resin to be cured by ultraviolet has been described as an example of

TABLE 1

| | | FIG. 8 | FIG. 9 | FIG. 10 | FIG. 11 | FIG. 14 |
|---|---|---|---|---|---|---|
| | | MANUFACTURING ANGLE | | | | |
| | | ANGLE $\theta=0°$ | ANGLE $\theta=30°$ | ANGLE $\theta=60°$ | ANGLE $\theta=90°$ | MANUFACTURE IN LAMINATION DIRECTION D2 CORRESPONDING TO WIDTH DIRECTION PERPENDICULAR TO FRONT-BACK DIRECTION D |
| AESTHETICS | LAMINATION UNEVENNESS | 3.6 | 3.6 | 2.8 | 1.6 | 3.2 |
| | TRANSPARENCY | 3.2 | 3.8 | 3.4 | 1.2 | 3.8 |
| | UNNATURALNESS | 3.6 | 3.8 | 3.2 | 1.2 | 3.2 | the additive manufacturing device 30. However, the additive manufacturing device may be an uplift-type stereolithography device that uses a photo-curable resin. The additive manufacturing may be a projection-type device that laminates layers by using projector light to cure the photo-curable resin. The additive manufacturing may be an inkjet-type device that laminates layers by injecting a liquid ultraviolet curable resin and emitting ultraviolet to cure the resin. The additive manufacturing may be a thermal dissolution lamination type device that laminates a thermal melting resin one by one layer. The additive manufacturing may be a powder sintering type device that emits high-output laser light rays onto a powdered material to sinter the material.

In the first and second embodiments, the orthodontic aligner 20 is formed in the shape having the recessed groove to cover the tooth crowns as one example. However, the orthodontic aligner may be formed in a shape to cover the tooth crowns and the gingiva, or the tooth crowns and floor or base portions.

In the first and second embodiments, the orthodontic aligner 20 is formed in the shape having the recessed groove to cover the tooth crowns of all teeth 10 of the lower jaw as one example. However, the orthodontic aligner may be formed in a shape having a recessed groove to cover the tooth crowns of some of the teeth.

In the first and second embodiments, the present disclosure is applied to the orthodontic aligner 20 to be attached to the tooth crowns of the lower jaw as one example. However, the present disclosure may be applied to an orthodontic aligner to be attached to the tooth crowns of the upper jaw.

In the first and second embodiments, the present disclosure is applied to the orthodontic aligner 20 to be placed within the mouth or oral cavity to cover the teeth 10. However, the present disclosure is not limited to the orthodontic aligner. The present disclosure may be applied to other mouthpieces such as mouthpieces for preventing teeth grinding, mouthpieces for treating temporomandibular joint disease or sleep apnea syndrome, mouthpieces for whitening, mouthpieces for indirect bonding, and mouthpieces for sports. In addition, the mouthpiece according to the present disclosure includes a device to be placed to cover the teeth.

The invention claimed is:

1. A method for manufacturing a mouthpiece to be placed within an oral cavity to cover teeth, the method comprising:
   laminating hardened layers using an additive manufacturing device, wherein the hardened layers do not form an annular lamination trace in a buccal portion that covers a buccal surface of a front tooth;
   wherein the mouthpiece is manufactured by laminating the hardened layers in a vertical direction such that an angle between a first intersection line and a second intersection line is 0 to 60°, 120 to 240°, or 300 to 360°, and wherein the first intersection line is defined by an occlusal plane of the mouthpiece and a vertical surface including a front-back direction, and the second intersection line is defined by a horizontal surface and the vertical surface including the front-back direction.

2. The method according to of claim 1,
   wherein the mouthpiece is manufactured by laminating the hardened layers in a vertical direction such that an angle between a first intersection line and a second intersection line is 0 to 30°, 150 to 210°, or 330 to 360°, and
   wherein the first intersection line is defined by an occlusal plane of the mouthpiece and a vertical surface including a front-back direction, and the second intersection line is defined by a horizontal surface and the vertical surface including the front-back direction.

3. The method of claim 1,
   wherein the mouthpiece is manufactured by laminating the hardened layers in a vertical direction relative to an occlusal plane of the mouthpiece.

4. The method of claim 1,
   wherein the mouthpiece is formed in a shape having a recessed groove to cover all of teeth of an upper jaw or a lower jaw.

5. The method of claim 1,
   wherein the mouthpiece comprises a support for supporting the mouthpiece, the support being formed on an opposite side of an occlusion portion of the mouthpiece in a vertical direction relative to an occlusal plane.

6. The method of claim 1,
   wherein the mouthpiece comprises a support for supporting the mouthpiece, the support being formed on an opposite side of an occlusion portion of the mouthpiece in a vertical direction relative to an occlusal plane.

7. The method of claim 2,
   wherein the mouthpiece comprises a support for supporting the mouthpiece, the support being formed on an opposite side of an occlusion portion of the mouthpiece in a vertical direction relative to an occlusal plane.

8. The method of claim 3,
   wherein the mouthpiece comprises a support for supporting the mouthpiece, the support being formed on an opposite side of an occlusion portion of the mouthpiece in a vertical direction relative to an occlusal plane.

9. The method of claim 4,
   wherein the mouthpiece comprises a support for supporting the mouthpiece, the support being formed on an opposite side of an occlusion portion of the mouthpiece in a vertical direction relative to an occlusal plane.

* * * * *